United States Patent [19]
Goodman

[11] Patent Number: 5,340,189
[45] Date of Patent: Aug. 23, 1994

[54] BULLETPROOF LEG PROTECTION DEVICE FOR A VEHICLE DOOR

[76] Inventor: R. Anthony Goodman, 1200 W. Taylor, No. 232, Sherman, Tex. 75090

[21] Appl. No.: 94,246

[22] Filed: Jul. 19, 1993

[51] Int. Cl.⁵ .......................... F41H 7/00; B60J 11/00
[52] U.S. Cl. ..................................... 296/152; 89/36.01
[58] Field of Search ................ 296/146.1, 146.13, 152, 296/95.1; 89/36.02, 36.04, 36.05, 36.07, 36.08, 36.09

[56] References Cited

U.S. PATENT DOCUMENTS

| | | | |
|---|---|---|---|
| 1,304,541 | 5/1919 | Clark | 89/36.09 |
| 1,791,701 | 2/1931 | Beal | 296/95.1 |
| 2,736,603 | 2/1956 | Payne | 296/146.13 |
| 3,540,773 | 11/1970 | Settle et al. | 296/152 |
| 3,855,898 | 12/1974 | McDonald | 89/36 H |
| 4,245,546 | 1/1981 | Chaires | 89/36 G |
| 4,316,286 | 2/1982 | Klein | 2/2.5 |
| 4,412,495 | 11/1983 | Sankar | 109/49.5 |
| 5,200,256 | 4/1993 | Dunbar | 428/212 |

*Primary Examiner*—Dean J. Kramer
*Attorney, Agent, or Firm*—Ross, Howison, Clapp & Korn

[57] ABSTRACT

A protective panel for a vehicle door includes a bullet resistant sheet having first and second portions. The first portion is adapted to be attached to the interior of a vehicle door. The second portion is interconnected to the first portion and is operable between a folded and an extended position. In the folded position, the second portion of the bullet resistant sheet is disposed adjacent to a door. In the extended position, the second portion extends below the bottom of a door when a door is in an open position with respect to a vehicle, thereby providing leg protection to a person standing behind a door.

2 Claims, 1 Drawing Sheet

BULLETPROOF LEG PROTECTION DEVICE FOR A VEHICLE DOOR

TECHNICAL FIELD OF THE INVENTION

The present invention relates to bulletproof protection devices, and more particularly to a bulletproof protection device for a vehicle door.

BACKGROUND OF THE INVENTION

Bullet resistant or bulletproof devices for vehicle been utilized to prevent a projectile from penetrating a vehicle. Such protective devices have included window and windshield devices as well as reinforced or armor linings for other portions of the vehicle in order to protect the vehicle's passengers. However, such devices do not provide sufficient protection for an individual located outside the vehicle, but adjacent to the vehicle. A need has thus arisen for a protection device for a vehicle which in addition to providing protection for a passenger, provides leg protection for an individual located adjacent to the vehicle, and particularly behind a vehicle door.

SUMMARY OF THE INVENTION

In accordance with the present invention, a protective panel for a vehicle door is provided. The panel includes a bullet resistant sheet having first and second portions. The first portion is adapted to be attached to the interior of a vehicle door. The second portion is interconnected to the first portion and is operable between a folded and an extended position. In the folded position, the second portion of the bullet resistant sheet is disposed adjacent to a door. In the extended position, the second portion extends below the bottom of a door when a door is in an open position with respect to a vehicle, thereby providing leg protection to a person standing behind a door.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
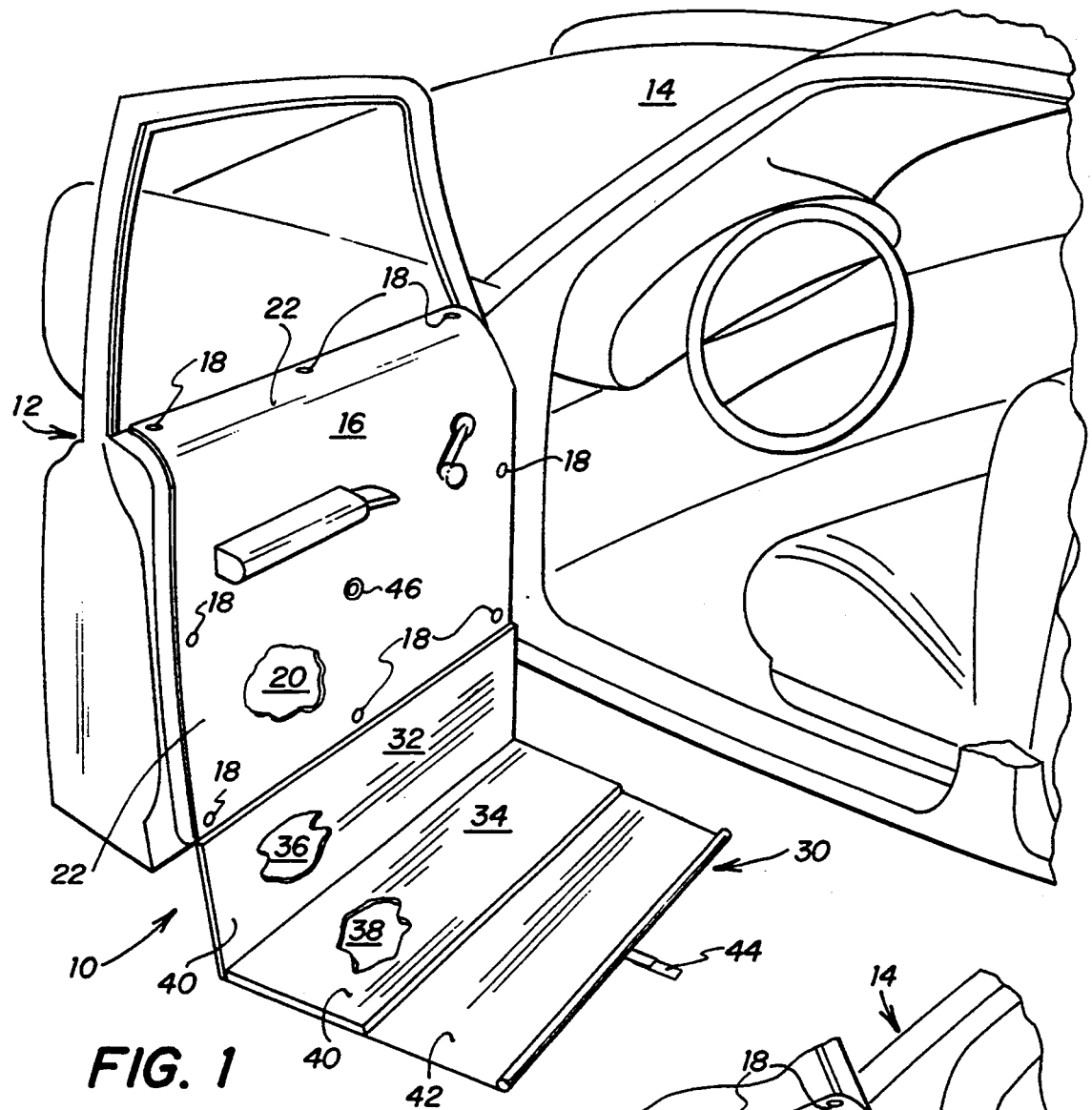
FIG. 1 is a perspective view of a vehicle illustrating the present protective panel in the extended and deployed position.
Figure 2:
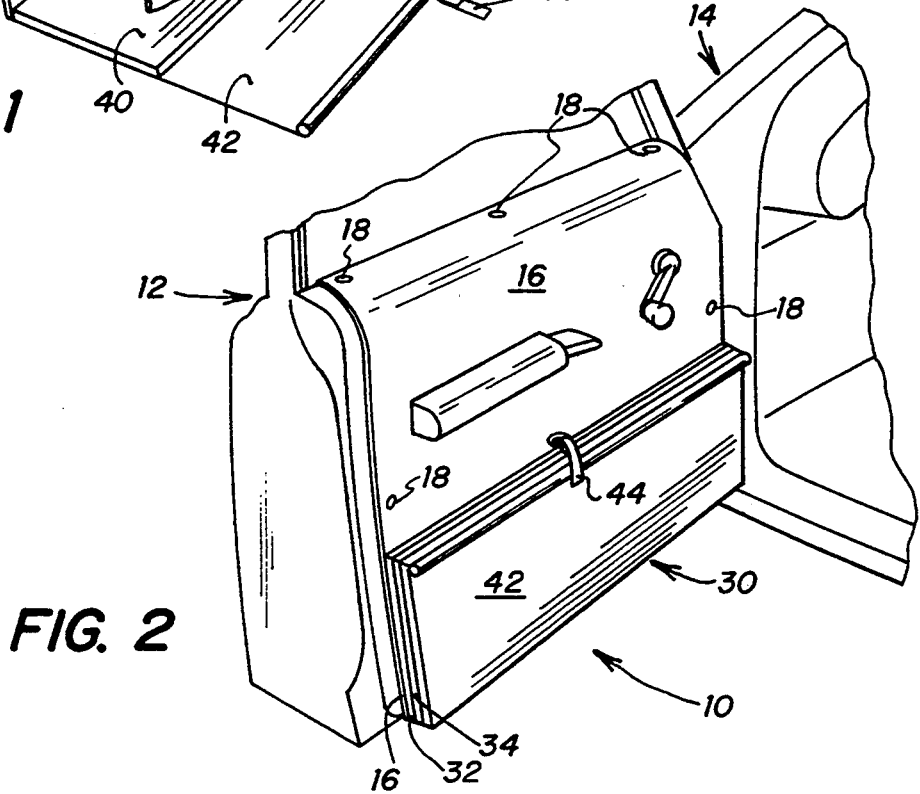
FIG. 2 is a perspective view of a vehicle illustrating the present protective panel, wherein the present protective panel is in the folded and stored position.

Referring simultaneously to FIGS. 1 and 2, the present protective panel is illustrated, and is generally identified by the numeral 10. Protective panel 10 is utilized in conjunction with a vehicle door, generally identified by the numeral 12 of a vehicle 14. Protective panel 10 includes a first portion 16 which is interconnected to the interior of vehicle door 12 utilizing attachment devices 18, which may comprise, for example, bolts or other fastening devices, well known to those skilled in the art. First portion 16 of protective panel 10 includes bullet resistant material 20 which is enclosed by a covering 22. Covering 22 may comprise, for example, cloth or bullet resistant fabric.

An important aspect of the present invention is the use of a second portion 30 of protective panel 10. Second portion 30 is hingedly interconnected to first portion 16 of protective panel 10 and is operable between a folded and stored position and an extended and deployed position. FIG. 1 illustrates second portion 30 in an extended and deployed position. FIG. 2 illustrates second portion 30 of protective panel 10 in a folded and stored position. Second portion 30 includes panels 32 and 34 which are hingedly interconnected. Panels 32 and 34 include bullet resistant material 36 and 38 which are enclosed by a covering 40. Interconnected to panel 34 is a covering 42 which is utilized for covering second portion 30 of protective panel 10 in the folded and stored position as illustrated in FIG. 2.

Bullet resistant material 20 of first portion 16 and bullet resistant material 36 and 38 of panels 32 and 34, respectively, may include such material as bullet resistant plastic, steel plates or composite fabrics. Such bullet resistant material is described in U.S. Pat. Nos. 3,855,898 and 5,200,256, which disclosures and drawings are incorporated herein by reference.

As illustrated in FIG. 2, second portion 30 of protective panel 10 is foldable such that panels 32 and 34 lie adjacent to first portion 16 in the folded and stored position. A strap 44 and latch 46 are provided to maintain panels 32 and 34 in the folded position attached to first portion 16 of protective panel 10.

In use, protective panel 10 is deployed to extend below the bottom of vehicle door 12. Panel 32 lies in a plane containing the first portion 16 of protective panel 10. Panel 34 lies in a plane generally perpendicular to panel 32 and provides additional support for protective panel 10 in the extended and deployed position. The vehicle passenger or individual seeking protection utilizing the present protective panel 10, stands behind vehicle door 12 and thereby has the individual's legs protected through the use of panel 32. The upper portion of the body of the person seeking protection is protected through the use of first portion 16 of the present panel 10. The present protective panel 10 is easy to operate, for example, as the vehicle passenger opens the door 12, strap 44 is disconnected from latch 46 such that panels 32 and 34 automatically fold outwardly to the extended and deployed position. When not in use, protective panel 10 can be easily folded to the position shown in FIG. 2, and does not interfere with the operation of vehicle 14 or door 12.

It therefore can be seen that the present invention provides for a bulletproof leg protection device for a vehicle door which can be easily operable for use by a vehicle passenger to provide leg protection for the passenger.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A protective panel for a vehicle door having a bottom, the panel comprising:
   bullet resistance material having first and second portions, said first portion adapted to be attached to the interior of a vehicle door;
   said second portion interconnected to said first portion and being operable between a folded and an extended position below the bottom of a vehicle door; and such that in said folded position, said second portion is disposed adjacent to a door in said extended position, said second portion extends below the bottom of a door when a door is in an open position with respect to a vehicle, thereby providing leg protection to a person standing behind a door when a door is open.

2. A protective panel for a vehicle door having a bottom, the panel comprising:

a panel having first and second portions, said first portion adapted to be attached to the interior of a vehicle door;

said second portion including bullet resistance material and being interconnected to said first portion and being operable between a folded and an extended position below the bottom of a vehicle door; and such that in said folded position, said second portion is disposed adjacent to a door and in said extended position, said second portion extends below the bottom of a door when a door is in an open position with respect to a vehicle, thereby providing leg protection to a person standing behind a door when a door is open.

* * * * *